(12) United States Patent
Hubbard et al.

(10) Patent No.: US 9,553,937 B2
(45) Date of Patent: Jan. 24, 2017

(54) COLLECTING PREFERENCE INFORMATION

(75) Inventors: Thomas Hubbard, Woburn, MA (US); Jukka-Pekka Salmenkaita, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 2346 days.

(21) Appl. No.: 10/878,238

(22) Filed: Jun. 28, 2004

(65) Prior Publication Data

US 2005/0288991 A1 Dec. 29, 2005

(51) Int. Cl.
*H04L 29/08* (2006.01)
*H04N 21/20* (2011.01)
*G06Q 30/02* (2012.01)
*G11B 27/10* (2006.01)
*G06Q 10/10* (2012.01)

(52) U.S. Cl.
CPC .............. *H04L 67/22* (2013.01); *G06Q 10/10* (2013.01); *G06Q 30/02* (2013.01); *G06Q 30/0201* (2013.01); *G11B 27/105* (2013.01); *H04L 67/2823* (2013.01); *H04L 67/322* (2013.01); *H04N 21/20* (2013.01); *G06F 2221/2133* (2013.01)

(58) Field of Classification Search
USPC ................................. 705/8, 9, 10
See application file for complete search history.

(56) References Cited

U.S. PATENT DOCUMENTS

| | | | |
|---|---|---|---|
| 5,237,157 A * | 8/1993 | Kaplan | 235/375 |
| 6,182,080 B1 * | 1/2001 | Clements | 707/610 |
| 6,266,664 B1 * | 7/2001 | Russell-Falla et al. | 707/700 |
| 6,321,221 B1 * | 11/2001 | Bieganski | 705/26.7 |
| 6,327,572 B1 * | 12/2001 | Morton et al. | 705/7.29 |
| 6,330,593 B1 * | 12/2001 | Roberts et al. | 709/217 |
| 6,473,794 B1 * | 10/2002 | Guheen et al. | 709/223 |
| 6,519,571 B1 * | 2/2003 | Guheen et al. | 705/14.66 |
| 6,536,037 B1 * | 3/2003 | Guheen et al. | 717/151 |
| 6,539,392 B1 * | 3/2003 | Rebane | 705/7.31 |
| 6,647,389 B1 * | 11/2003 | Fitch et al. | |
| 6,662,192 B1 * | 12/2003 | Rebane | |
| 6,675,162 B1 * | 1/2004 | Russell-Falla et al. | |
| 6,684,240 B1 * | 1/2004 | Goddard | 709/217 |
| 6,950,804 B2 * | 9/2005 | Strietzel | 705/26.8 |
| 7,046,956 B1 * | 5/2006 | Cohen | 455/3.06 |

(Continued)

FOREIGN PATENT DOCUMENTS

| | | |
|---|---|---|
| GB | 2367216 A | 3/2002 |
| WO | 01/71598 A1 | 9/2001 |

OTHER PUBLICATIONS

Waller, A.O.; Jones, G.; Whitley, T.; Edwards, J.; Kaleshi, D.; Munro, A.; MacFarlane, B.; Wood, A.; , "Securing the delivery of digital content over the Internet," Electronics & Communication Engineering Journal , vol. 14, No. 5, pp. 239-248, Oct. 2002.*

(Continued)

*Primary Examiner* — Gurkanwaljit Singh
(74) *Attorney, Agent, or Firm* — Ditthavong & Steiner, P.C.

(57) ABSTRACT

In order to allow a first presentation application to utilize tracked information collected by a second presentation application, the tracked information being how digital content is presented in user equipment, the information is collected by user equipment into a presentation application independent ratings data file.

18 Claims, 4 Drawing Sheets

(56) References Cited

U.S. PATENT DOCUMENTS

| | | | |
|---|---|---|---|
| 7,120,687 B1* | 10/2006 | Tessman et al. | 709/224 |
| 7,155,405 B2* | 12/2006 | Petrovich | 705/26.61 |
| 7,181,412 B1* | 2/2007 | Fulgoni et al. | 705/7.32 |
| 7,185,065 B1* | 2/2007 | Holtzman et al. | 709/217 |
| 7,188,076 B2* | 3/2007 | Bensemana | 705/7.32 |
| 7,334,099 B2* | 2/2008 | Witt et al. | 711/162 |
| 7,346,556 B2* | 3/2008 | Upendran et al. | 705/26.41 |
| 7,353,270 B2* | 4/2008 | Kumar et al. | 709/224 |
| 7,359,899 B2* | 4/2008 | Larason et al. | |
| 7,440,555 B2* | 10/2008 | Breitenbach et al. | 379/88.13 |
| 7,573,785 B2* | 8/2009 | Kudou | 369/30.05 |
| 7,792,756 B2* | 9/2010 | Plastina et al. | 705/51 |
| 7,797,343 B2* | 9/2010 | Morain et al. | 707/791 |
| 2001/0044739 A1* | 11/2001 | Bensemana | 705/10 |
| 2002/0023010 A1* | 2/2002 | Rittmaster et al. | 705/26 |
| 2002/0049717 A1* | 4/2002 | Routtenberg et al. | 707/1 |
| 2002/0069132 A1* | 6/2002 | Perkes et al. | 705/26 |
| 2002/0115447 A1* | 8/2002 | Martin et al. | 455/456 |
| 2002/0184180 A1* | 12/2002 | Debique et al. | 707/1 |
| 2002/0194601 A1* | 12/2002 | Perkes et al. | 725/44 |
| 2003/0004793 A1* | 1/2003 | Feuer et al. | 705/14 |
| 2003/0023421 A1* | 1/2003 | Finn et al. | 704/1 |
| 2003/0033331 A1* | 2/2003 | Sena et al. | 707/513 |
| 2003/0036948 A1 | 2/2003 | Woodward et al. | |
| 2003/0084126 A1* | 5/2003 | Kumar et al. | 709/219 |
| 2003/0110503 A1* | 6/2003 | Perkes | 725/86 |
| 2003/0126146 A1* | 7/2003 | Van Der Riet | 707/100 |
| 2003/0135513 A1* | 7/2003 | Quinn et al. | 707/102 |
| 2003/0187749 A1* | 10/2003 | Peled et al. | 705/26 |
| 2003/0191690 A1* | 10/2003 | McIntyre et al. | 705/14 |
| 2003/0236582 A1* | 12/2003 | Zamir et al. | 700/94 |
| 2004/0002995 A1 | 1/2004 | Martino et al. | |
| 2004/0003398 A1* | 1/2004 | Donian et al. | 725/34 |
| 2004/0006509 A1* | 1/2004 | Mannik et al. | 705/14 |
| 2004/0064357 A1* | 4/2004 | Hunter et al. | 705/10 |
| 2004/0064476 A1* | 4/2004 | Rounds | 707/104.1 |
| 2004/0122731 A1* | 6/2004 | Mannik et al. | 705/14 |
| 2004/0153504 A1* | 8/2004 | Hutchinson et al. | 709/204 |
| 2004/0199527 A1* | 10/2004 | Morain et al. | 707/100 |
| 2004/0223417 A1* | 11/2004 | Bardsley et al. | 369/30.09 |
| 2004/0258219 A1* | 12/2004 | Breitenbach et al. | 379/88.22 |
| 2004/0259631 A1* | 12/2004 | Katz et al. | 463/25 |
| 2005/0114205 A1* | 5/2005 | Nelson et al. | 705/14 |
| 2005/0149872 A1* | 7/2005 | Fong et al. | 715/727 |
| 2005/0254390 A1* | 11/2005 | Inokuchi et al. | 369/59.23 |
| 2006/0242072 A1* | 10/2006 | Peled et al. | 705/51 |

OTHER PUBLICATIONS

Translation of Chinese Office Action for corresponding CN Application No. 200580021722.4, Aug. 14, 2009, China.
Office Action of corresponding Korean Patent Application No. 2006-7026678, dated Jan. 28, 2010, Korean. pp. 1-12.
Chinese Office Action for corresponding CN Application No. 200580021722.4, Oct. 8, 2010, pp. 1-14.
Office Action of corresponding Korean Patent Application No. 10-2006-7026678, dated Oct. 27, 2010, Korean. pp. 1-6.
Korean Office Action for corresponding KR Application No. 10-2011-7004853, Jun. 15, 2011, pp. 1-8.
Chinese Office Action for corresponding CN Application No. 200580021722.4, Apr. 19, 2011, pp. 1-15.
Korean Office Action for related Korean Patent Application No. 2011-7004853 dated Jan. 20, 2012, pp. 1-4.
Office Action for corresponding Chinese Application No. 200580021722.4, dated Dec. 26, 2014, 16 pages (English Language Summary Included).

* cited by examiner ab# COLLECTING PREFERENCE INFORMATION

FIELD OF THE INVENTION

The invention relates to collecting preference information, and especially collecting preference information in user equipment based on the user's digital content consuming habits.

BACKGROUND OF THE INVENTION

Due to the evolution of information technology, the amount of information available to people has become vast. The information explosion means that the number of items in only one information category, such as music, movies, books, news, web pages, has become so large that a single person cannot possibly view them all in order to select the relevant ones. For example, the list of music service providers in the Internet is growing, as well as downloadable music and videos.

In order to help their customer's find interesting items, many commercial sites on the Internet provide their users with recommendations. Typically these recommendations are generated on the basis of the user's preference information, records of the purchased item(s) and the utilization of collaborative filtering. The service provider on the commercial site receives the user's preference information when the users explicitly rate, for example, music or books that they like. In collaborative filtering, the users' ratings are aggregated and when a user rates or buys something, the collaborative filter on the commercial site checks for other people who liked or bought the same item and what other items those people also liked or bought and then returns these items as recommendations to the user. One problem with these explicit ratings is that users seldom change ratings because it is laborious and therefore the explicit ratings are static profiles not reflecting the current, relevant likes and dislikes of the user—even when the ratings are updated by the commercial site every time the user buys something. Another problem is that the user has to perform the rating separately for each commercial site he uses.

A certain kind of "automatic rating feature", called tracking, is provided by presentation applications, such as Microsoft's Media Player or Apple's iTunes, running in computers for playing music and video. The presentation applications typically keep track of when you last played a song, what year the song was released, how many times each song has been played, when it was imported to the song library, etc. One of the problems associated with the above arrangement is that tracking is tied to a particular presentation application (i.e. Media Player or iTunes), each of which stores the tracked information in a proprietary format, and if a user changes the presentation application, the previously tracked information cannot be used by the new application. Another problem is that the tracking is tied to the corresponding personal computer that tracks the music played by the computer. However, music is more and more often listened from a portable digital player, which can be synchronized with the computer's music library. The portable players do not track played music.

BRIEF DESCRIPTION OF THE INVENTION

An object of the present invention is to track how digital content is presented in user equipment and to form, presentation application independently, user preference information based on the user's consuming habits of the digital content. The object of the invention is achieved by a method, software application, user equipment and a system which are characterized by what is stated in the independent claims. The preferred embodiments of the invention are disclosed in the dependent claims.

The invention is based on the idea of realizing the problem and solving it by adding a presentation application independent tracker to the user equipment, the tracker being arranged to log the user's consuming habits of digital content on the basis of the information the tracker receives, depending on the embodiment, either from a modified presentation application, from a plug-in for the presentation application or from a codec converting presentation application calls to a format understood by the operating system of the user equipment. An advantage of the invention is that while the user is consuming digital content, his consumer habits will be collected in the background implicitly and thus formed preference information is based on his actual usage of digital contents without requiring the user's explicit rating actions. Other advantages are that the preference information is both service provider independent and presentation application independent, therefore enabling different presentation applications and/or service providers to utilize the same collected presentation information.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention is applicable to be used with any user equipment device that can be used for presenting, for example playing or depicting, digital content. With digital content is meant anything represented in digital format. Examples of digital content are songs, speeches, videos, talking books, documents, movies, games, images, etc. Especially well the present invention is applicable to mobile terminals, which may be digital players or multimedia content mobile terminals allowing not only communication by calling or messaging but also playing music, playing games and/or photographing. The systems, protocols and apparatuses for presenting digital content develop rapidly. Such development may require extra changes to the invention. Therefore, all words and expressions should be interpreted broadly and they are intended to illustrate, not restrict the invention.

In the following, the invention will be described in more detail with examples in which a wireless mobile terminal is used as an example of user equipment according to the invention and playing music is used as an example of presenting digital content without restricting the invention to such user equipments and digital contents. The user equipment may also be a non-mobile apparatus, such as a personal computer.

Figure 1:
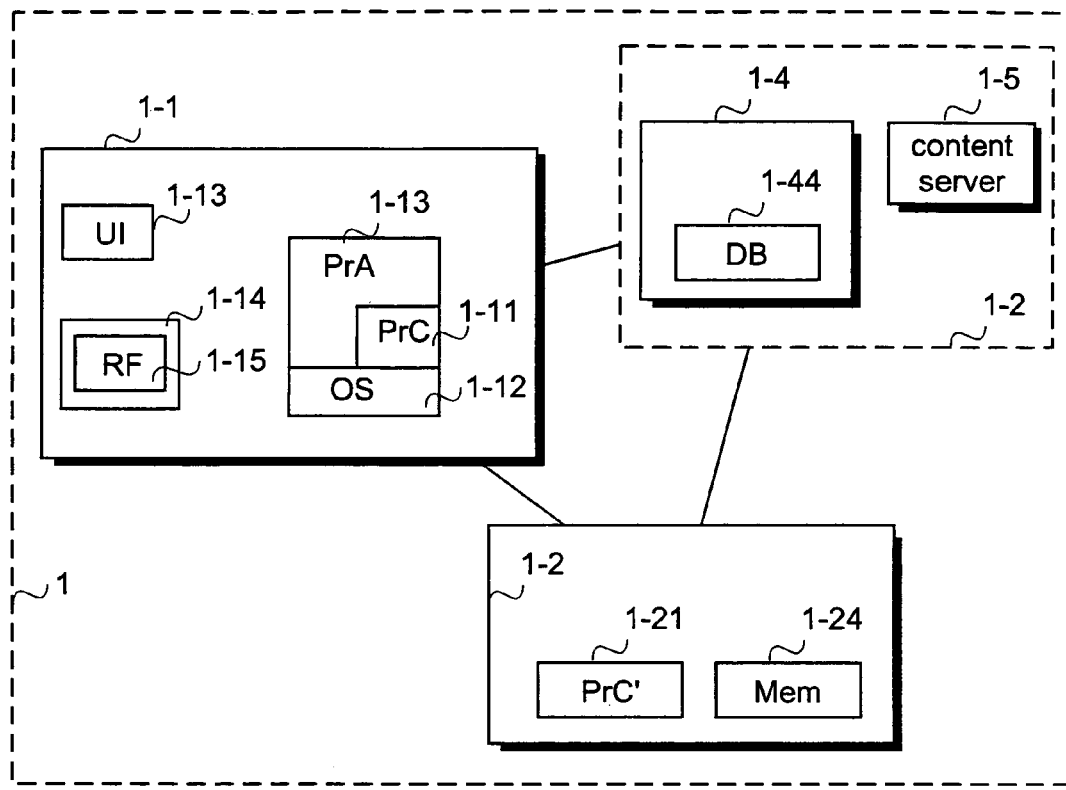
FIG. 1 shows an exemplary system architecture.

FIG. 1 illustrates one exemplary system according to the invention. The implementation of the devices and the system entities may vary according to the embodiment used. FIG. 1 shows a simplified system illustrating only entities needed for describing different embodiments of the invention. It is apparent to a person skilled in the art that the systems also comprise other functions and structures that need not be described in detail herein. It is also apparent to a person skilled in the art that the simplest embodiment of the invention is to have user equipment equipped with the most simplified preference client functionality according to the invention. In these embodiments of the invention, the preference client is used for tagging the user's music.

The exemplary system 1 illustrated in FIG. 1 comprises a mobile terminal (user equipment) 1-1, a personal computer 1-2 and the Internet 1-3 comprising a preference server 1-4 and one or more digital content provider servers 1-5 or corresponding servers. The mobile terminal 1-1 may be connectable to the personal computer 1-2 and/or to the Internet 1-3 wirelessly or via a fixed connection. The personal computer 1-2 may be connectable to the Internet 1-3 wirelessly or via a fixed connection The mobile terminal 1-1 contains a "software stack", which comprises a preference client PrC 1-11 between an operating system OS 1-12 and the presentation application PrA 1-13 needed for playing music. In one embodiment of the invention, the software stack also comprises a plug-in (not shown in FIG. 1) for the presentation application. The operating system OS 1-12 is preferably Symbian but other operating systems, such as Microsoft Windows or Linux, may be used as well. Examples of presentation applications are Media Player and iTunes, mentioned above. The used presentation application and the operating system are irrelevant to the present invention. The mobile terminal 1-1 further contains user interface UI 1-13, memory 1-14 for ratings data file RF 1-15 and a processor (not shown in FIG. 1). The ratings data file may be implemented as a database. The creation and modification of the ratings data file, which can be called a ratings profile, will be described later with FIGS. 4 and 5, for example. The ratings data file is usable at least by two different applications, for example by two different presentation applications. The memory 1-14 or part of it can be on a module, the module being preferably replaceably insertable into the mobile terminal, such as an MMC card (multimedia card) or a SIM (Subscriber identity module).

The preference client 1-11 is a software application that may run in the background on a mobile terminal while the user is listening to music there. The term "software application" also covers a library of function calls on Linux or Windows or corresponding operating system. The preference client can be called preference collector since it collects preference information, i.e. creates and updates the ratings data file RF 1-15, as will be described below in more detail with FIGS. 4 and 5. The preference client 1-11 may be shipped with the mobile terminal or it may be a downloadable plug-in to the mobile terminal. Since the preference client 1-11 is a low level application, e.g. a system library or service, it has access to operating system functionality, such as device drivers etc., and therefore the preference client may interrogate the operating system for different features, such as volume, day of the week, time of the day, etc.

The personal computer 1-2 also contains a preference client 1-21 PrC' and memory Mem 1-24 for storing downloaded or copied music, etc. The preference client 1-21 in the personal computer may be similar to the one in the mobile terminal or comprise different functionality, as will be described below in more detail. The personal computer 1-2 can be seen as another type of user equipment.

The preference server 1-4 is a server component, such as software, that receives ratings data files, in whole or in part, that the preference clients have collected and which are sent from the mobile terminal either directly or via the personal computer. The preference server 1-4 processes the ratings data files into one or more databases 1-42 containing preference information and may then provide recommendations back to mobile terminals and/or provide reports of how music is being consumed to other servers. The database may be a relational database, such as an open source SQL relational database, for example. The preference information is preferably stored in file format easily accessed by users, such as XML format. The recommendations are typically based on collected data patterns and statistics on the consumption of music. The preference server 1-4 may reside on the mobile terminal, a web server (as disclosed in FIG. 1), a proxy, a gateway node (a node enabling data transfer within a mobile network, as well as between external data networks and the mobile network) and/or other intermediary.

Figure 2:
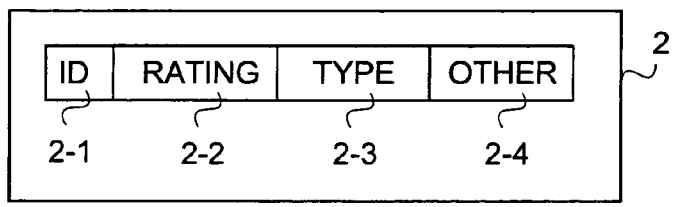
FIG. 2 illustrates the structure of an exemplary rating record.

The ratings data file contains rating records in a presentation application independent format. FIG. 2 illustrates a structure of an exemplary rating record. The rating record is preferably in the form of metadata, which is machine understandable information describing the content, quality, condition, and other characteristics of data. The rating record 2 contains a song identifier ID 2-1, the preference RATING 2-2, the type of rating TYPE 2-3 and also possibly other metadata OTHER 2-4. The song identifier 2-1 comprises the identification information on the song, such as the name and/or the player, etc. The song identifier may be the song's ISRC (International Standard Recording Code) number, for example. However, the exact type of the song identifier is irrelevant to the present invention. The preference 2-2 is the actual rating of the song and it is formed as disclosed in greater detail below. The type of rating 2-3 indicates whether the rating is implicit, i.e. given by the preference client, or explicit, i.e. given by the user. The other metadata 2-4 may contain information indicating to the distribution of the rating record. The distribution of the ratings data file, and its rating records will be described in detail below. The first two items, i.e. the identifier 2-1 and the preference 2-2, are the only mandatory items needed in a rating record according to the invention, the other two are optional.

A rating record is preferably created for a song by the preference client when the user terminal becomes aware of the song, for example when a song is downloaded to the user terminal. The preference client may also be arranged to scan discs or memory cards inserted into the user equipment, and on the basis of the scanned information, to create rating records when necessary.

Figure 3A:
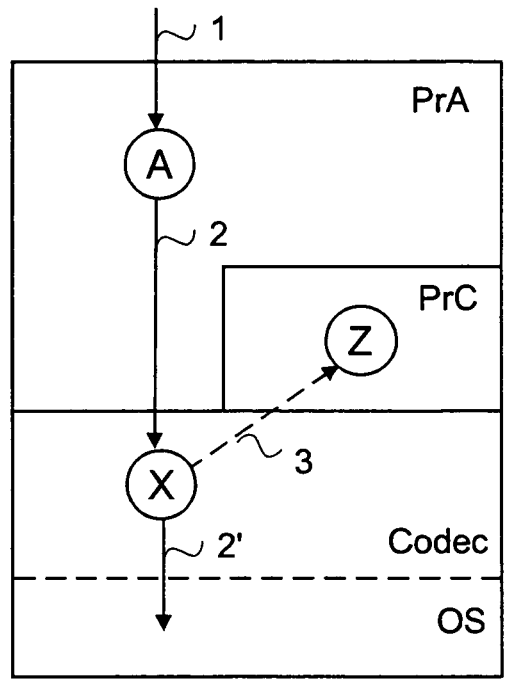
FIGS. 3A, 3B and 3C illustrate different alternatives of the invention.
Figure 3B:
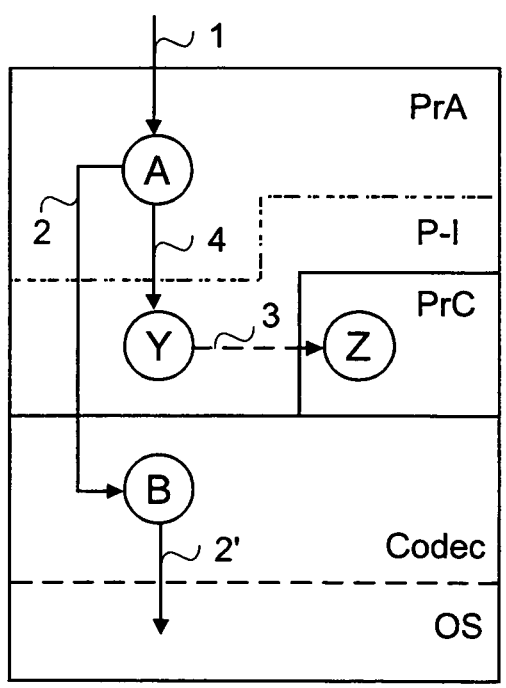
Figure 3C:
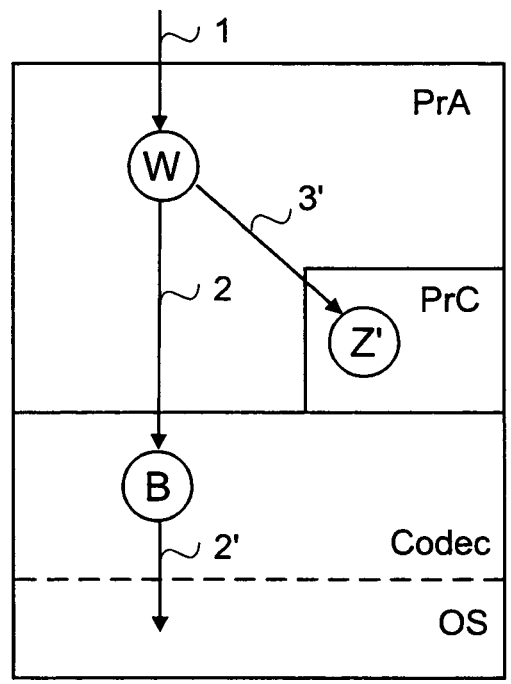

In the following, FIGS. 3A, 3B and 3C illustrate in more detail different alternatives of the "software stack" according to the invention. In other words, they illustrate different possibilities how the preference client PrC obtains the information for rating records.

In all FIGS. 3A, 3B and 3C, the operating system is divided into two parts: a codec and operating system OS. The codec exists between the presentation application and the actual operating system or as part of the operating system itself. The codec provides digital media decoding and encoding. The decoding and encoding process uses functionality from the operating system to enable the presentation or to encode the digital content. Thus, the codec is part of a platform on which different applications, such as presentation applications, can be developed. Furthermore, in all FIGS. 3A, 3B and 3C, user input 1 is received by the presentation application PrA, the user input being either direct user input, such as "start to play", "skip over", "show playing list", etc, or indirect user input not requiring the user's involvement, such as "a song ended in the playing list and another started" or "song ended" or "song ended and restarted". Typically the user input is in a presentation application format.

The phrase "information to be logged" used below means user input which is used for creating and updating rating records. For example, inputs like "show playing list" or "pause" or "release pause" may not be used for creating and updating rating records.

FIG. 3A illustrates the first exemplary embodiment of the invention. In the first exemplary embodiment of the invention, the codec, i.e. the part of the platform receiving calls targeted to the actual operating system, is modified to send information to the preference client PrC which uses this information to log the user's music listening habits.

In the first exemplary embodiment, in response to the user input 1, the presentation application PrA calls, in point A, the operating system by sending call 2. The call contains identification information indicating the digital content the call relates to. The codec receives the call and activates by 2', in point X, required operating system services for fulfilling the call. Furthermore, the codec checks, in point X, whether or not the call 2 contains information to be logged, and if it does, the codec transforms the information, in point X, to a presentation application independent format. Then the codec forwards, in point X, the information as a function call 3 to the preference client PrC, which then logs, in point Z, user's music listening habits, as will be described later.

In the second alternative, illustrated in FIG. 3B, a plug-in P-I for the presentation application is added to the "software stack" to send information to the preference client for logging the user's music listening habits. In order to detect and send the information to the preference client, the plug-in is preferably arranged to take over the playing control of the presentation application. In the alternative illustrated here, the plug-in causes the presentation application to act as described below. However, it is obvious for one skilled in the art that other alternatives on how to implement the plug-in exist. The plug-in may be a separate plug-in or incorporated into a preference client plug-in.

In the second alternative, in response to the user input 1, the presentation application PrA notifies, in point A', the plug-in by sending notification 4. The notification contains identification information indicating the digital content the call relates to. The plug-in detects the notification and checks, in point Y, whether or not the notification 2 contains information to be logged, and if it does, the plug-in transforms, in point Y, the information to a presentation application independent format. Then the plug-in forwards, in point Y, the information as a function call 3 to the preference client PrC, which then logs, in point Z, user's music listening habits, as will be described later. The presentation application PrA also calls, in point A', the operating system by sending call 2. The call is received by the codec, which activates by 2', in point B, the required operating system services for fulfilling the call. Thus, the basic functionality of the presentation application is not amended by the plug-in.

The third alternative (not shown) differs from the second one only in that instead of the presentation application plug-in, the presentation application itself is modified to perform the functionality described above with point Y. In other words, points A and Y are combined and no plug-in is required.

In the fourth alternative, illustrated in FIG. 3C, the presentation application itself is modified to send information to the preference client PrC. In the fourth alternative, in response to the user input 1, the presentation application PrA calls, in point W, the operating system by sending call 2 including identification information. The codec activates by 2', in point B, the required operating system services for fulfilling the call. The presentation application PrA also transforms, in point W, the call information, including identification information, into metadata-format and sends, in point W, the metadata 3' to the preference client PrC. The preference client PrC checks, in point Z', whether or not the metadata 3' contain information to be logged, and if it does, the preference client then logs, in point Z', user's music listening habits, as will be described later.

In the fifth alternative (not shown), the presentation application sends the call 2 (including identification information) to the preference client, which is arranged to transfer the call into a metadata format, either before deciding whether or not it contains information to be tracked or during logging.

Yet in another alternative (not shown), based on combinations of the second and fourth or fifth alternatives, the presentation application is modified to notify the plug-in when music is being played, and the plug-in informs the preference client using preferably the metadata format.

Another way to implement above alternatives is to have a function for each input to be logged, in which implementation the preference client notices the information to be logged on the basis of the function received and the identification information inside the function.

It is obvious to one skilled in the art that the features described in the above with different alternatives may be combined separately to form yet another alternative. For example, the codec or the plug-in may not check the content of the call 2 but send all information to the preference client, which then performs the checking.

Figure 4:
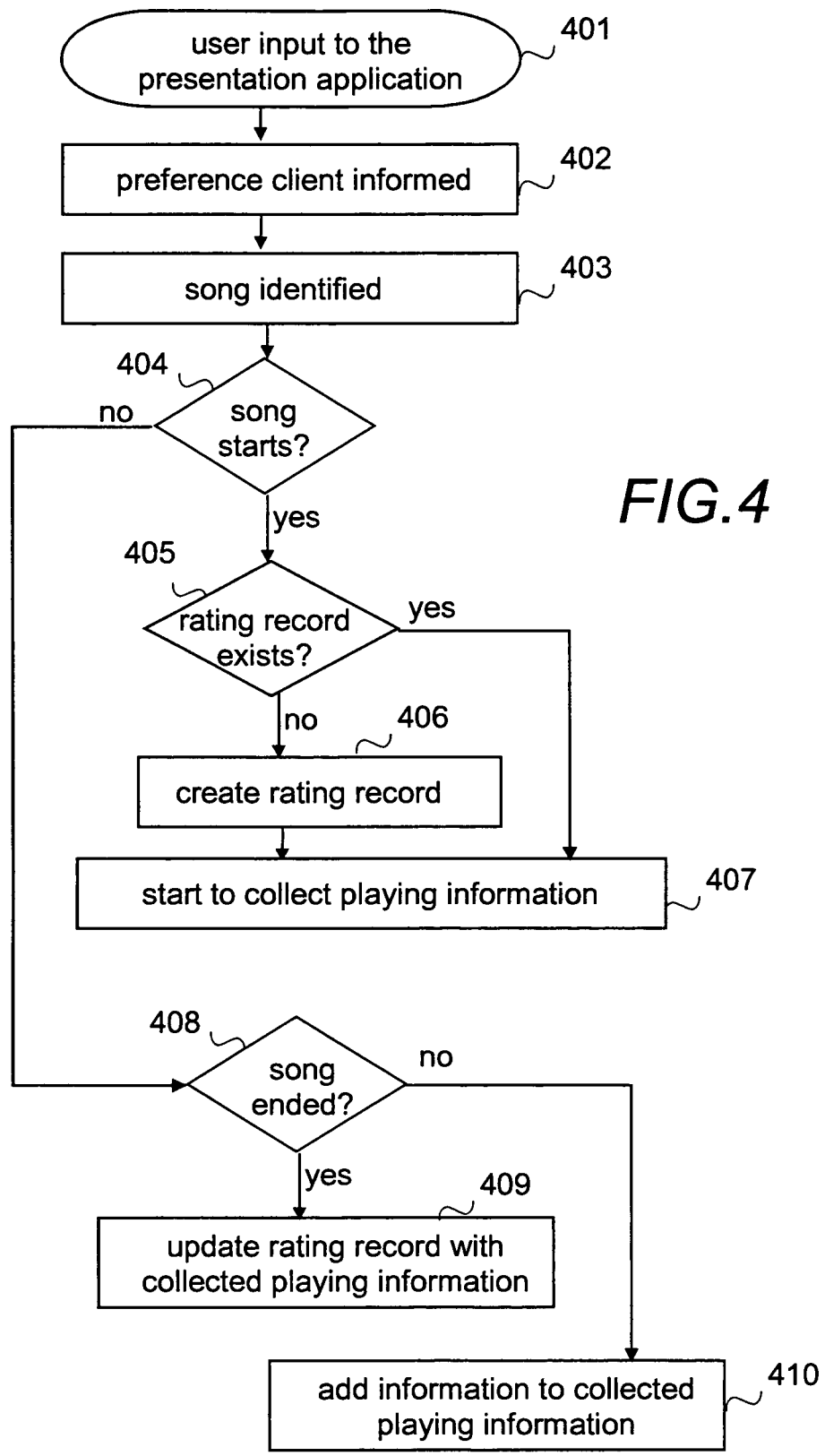
FIG. 4 illustrates the first exemplary embodiment of the preference client according to the invention.

FIG. 4 illustrates a first exemplary embodiment of a preference client according to the invention. In the first exemplary embodiment of the invention, the preference client receives information only on user inputs containing information to be logged. In the first preferred embodiment of the invention, the information is already in a presentation application independent format. For FIG. 4, it has been assumed for clarity's sake that a user input is one of the following "play", "stop playing" and "change volume".

Referring to FIG. 4, a user input to the presentation application is received (step 401), and therefore, the preference client is informed, in step 402, about this user input. The preference client identifies, in step 403, the song to which the call relates from the identification information in the call. The identification information may be the song's name or filename or some other corresponding information, as explained above. Then the preference client checks, in step 404, whether or not the user starts to play a song. If the answer is yes, the preference client checks, in step 405, from the ratings data file whether or not a rating record exists for this song. If there is no rating record for this song, a rating record is created, in step 406, and the preference client starts, in step 407, to collect playing information for the rating record. If a rating record for this song exists in the ratings data file (step 405), there is no need to create a new rating record but the preference client starts, in step 407, to collect playing information for the existing rating record. In some other embodiment of the invention, the checking step 405 is skipped and a new rating record is created every time and rating records are later combined on the basis of the identifier. In this embodiment timing information is kept as well.

If the user did not start to play a song (step 406), the preference client checks, in step 408, whether or not the playing of the song ended, either because the song ended or because the user ended the playing of the song. If the answer is yes, the preference client updates, in step 409, the rating record with the collected playing information. If the song is still playing (step 408), information is added, in step 410, to the collected playing information. The information may be that the user lowered the volume, for example.

Steps 403 to 410 illustrate how the preference client logs the user's music listening habits, and they form a "basic preference client" of the invention which has to be implemented in the mobile terminal. Additional features to the preference client are described below.

The preference client may be arranged to check, in response to receiving information on user input, whether or not the user input contains information to be logged, and to perform the steps of 403 to 410 only if the user input contains information to be logged. This situation is illustrated above with FIG. 3C.

The collected information is at least what music is played and how often it is played. The preference client may also collect information how loudly a song is played, when it is played, where it is played, what the user was doing when the song was played and/or whether or not the song was skipped over, for example. What information can be collected depends on the characteristics of the mobile terminal. For example, the mobile terminal may know its location and/or have motion sensors for determining whether the user is staying still, running or walking. Since the mobile telephones allows different user profiles, the preference client may be arranged to collect and update the rating records according to the user profile-specifically or take the user profile used when music was listened to as a piece of information to be collected.

When the rating record is updated, the preference client uses different, predetermined calculation rules to calculate the rating for this specific song. For example, if the user habitually listens to song A very loudly, but skips over his former favorite song B, it implies that the user likes song A but does not like song B as much as earlier and the rating of A stays very high whereas the rating of song B decreases. At the simplest, it is only calculated how many times a song is played, and preferably the date when the song was last time played, is also taken into account, and in these embodiments of the invention in step 407 the number is increased and steps 408 to 410 are replaced by ignoring the user input or by simply leaving them out. However, typically the rating is a floating-point number between zero and one so that the larger number indicates that the user likes the song more. The exact calculation rules are irrelevant to the present invention and therefore need not be discussed here.

The information on volume, the time of day and day of the week can be used when generating play list(s) and recommendations. For example, if the user goes to the gym on Tuesdays and Thursdays from 10-11 and listens to AC/DC very loudly then the preference client may be used to recommend Marilynn Manson on Monday nights so that the user can be ready for the gym on Tuesday morning.

Since the preference client is capable of receiving information on played music from various presentation applications, the preference client is preferably implemented to collect information from all presentation applications in the user equipment, including FM radios, etc, and update the ratings data file regardless of the presentation application used. The preference client may also be configured to maintain the ratings data files presentation application—specifically in addition to the above described common ratings data file or instead of the common ratings data file.

Figure 5:
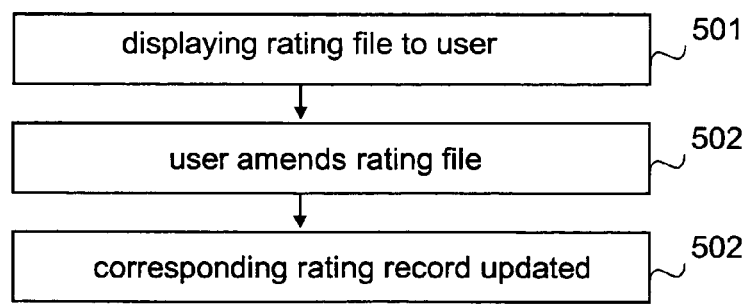
FIG. 5 illustrates an optional feature of the preference client.

The preference client may have, as an additional feature, an explicit rating option allowing the user to modify explicitly the ratings data file either from the mobile terminal and/or via the personal computer and/or via the preference server. This additional feature is illustrated in FIG. 5, which starts when the rating file is displayed to the user (step 501). Depending on the settings and the user's profile in use, the rating file is displayed either partly or wholly. Then the user amends, in step 502, via the user interface, for example, the rating file. The user may add, remove and/or edit rating records. This explicit rating is typically implied by numerical values and/or by moving the rating records from one position to another in relation to other rating records. In response to the amendment, the preference client updates, in step 503, the corresponding rating record, and thus the ratings data file.

The preference client may, as an additional feature, transmit information with the preference server, either directly or indirectly via the personal computer. This additional feature may have an optional filtering feature, according to which the content of the ratings data file is filtered and the filtered content is sent to the preference server. This optional feature allows the user to control what information is sent to the Internet. What is filtered may be defined by the user rating record specifically, user profile-specifically or as a common filtering feature. The user profile-specific filtering feature definitions may be stored in the mobile terminal memory as part of the user profile definitions, for example. The common filtering feature definitions may be stored in the mobile terminal memory either separately or as part of the ratings data file, for example. The filtering may be performed by some other application geared toward privacy and/or the user equipment may negotiate with the preference server in order to offer more information than the information content according to original filtering settings. The filtered ratings data file content may be genre(s) liked/disliked, artist(s) liked/disliked, songs liked/disliked, the user's ratings of the songs, types of ratings and/or other metadata, such as playing times, average volume, purchase info, PII (personal identifiable information), etc. Examples of the PII are the user's name, address and phone number.

Figure 6:
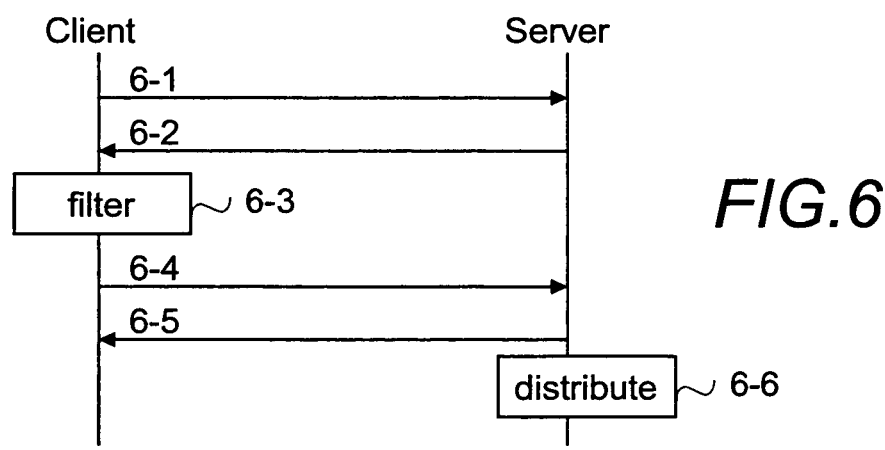
FIG. 6 shows how information is exchanged between the preference client and a server.

The information exchange is described in FIG. 6. The preference client wants to send the content, or part of the content, of the ratings data file to the preference server. The preference client may be configured to periodically send rating information to the preference server or the user may explicitly request sending, for example. Therefore the preference client sends message 6-1 to the preference server. Message 6-1 may be an HTTP GET request (for example, GET/HTTP/1.1). In response to receiving message 6-1, the preference server sends a response 6-2 containing an address to which the ratings data file can be sent. Message 6-2 may be an HTTP 200 OK message (for example, HTTP 200 OK Opt: "rating-data-file-submission"; ns=15 15-submit:"http://example.com/rating/"). In response to message 6-2, the preference client filters, in point 6-3, the ratings data file according to the filtering rules defined by the user as described above. When the filtering is performed, the preference client sends the filtered ratings data file content to the preference server in message 6-4. Message 6-4 may be an HTTP POST message (for example, POST http://example-.com/rating HTTP/1.1<filtered ratings data file content>). After that, the preference server may send recommendations to the preference client in message 6-5, for example, and distribute, in point 6-6, the received ratings data file content as preference information, or as part of the preference information, to other servers.

If the filtering option is not implemented, then point 6-3 is skipped over.

The preference information according to the invention provides better understanding of the consumer's actual preferences and enables music service providers to differentiate themselves and to increase sales because they can provide customers with better recommendations and enhanced personalization.

Shop retailers can download the preference information from the database in the preference server via the Internet and since it is based on the actual usage of music reflecting true references, the shop retailers may, on the basis of the information, minimize restocking of potentially unpopular music, while maximizing restocking of potentially popular one.

Original content providers can utilize the downloaded preference information from the database in the preference server when they create ads. They can also forward the information to the studios and artists so that they can take the information into account by updating the upcoming releases, for example.

The additional features according to the invention are optional and some of them may be implemented in the personal computer and some in the mobile terminal and/or both may have the same additional features and/or the preference client in the personal computer may even be implemented to perform only one or more additional feature without the features of the above-described basic preference client. Furthermore, it is obvious to one skilled in the art that the rating information collected according to the present invention can also be utilized according to prior art. For example, the personal computer may synchronize the rating information received from the mobile terminal with the rating information in the personal computer by an application, such as SyncML defined currently by OMA (Open Mobile Alliance) for universal synchronization of remote data and personal information across multiple networks, platforms and devices. On the basis of the collected rating information, playing lists may be formed, the Internet searched and related digital content that may be to the interest of the user suggested.

The embodiments or parts of the embodiments described above may be freely combined in order to create new embodiments of the invention. The most simplified embodiment of the invention is implemented with the basic preference client and rating records having the content identifier and the preference.

User equipment and a software application implementing the functionality according to one embodiment of the present invention not only comprise means required for presenting digital content, but also means for logging how the user is consuming the digital content in a presentation application independent form. In addition, the user equipment, the software application, another type of user equipment, a further software application and/or a server component may comprise means for one or more other functionalities described above. No hardware changes are required. User equipment and servers comprise processors and memory that can be utilized in the functions of the invention. All changes required for implementing the invention can be made as additional or updated software routines and/or by adding application-specific integrated circuit(s) (ASIC).

It will be obvious to a person skilled in the art that, as the technology advances, the inventive concept can be implemented in various ways. The invention and its embodiments are not limited to the examples described above but may vary within the scope of the claims.

The invention claimed is:
1. A method comprising:
determining to store, by an apparatus, a ratings electronic data file including a rating record specifying at least identification information on a digital content item and a rating value indicating consumption of the digital content item, the ratings electronic data file being in a presentation application independent format and usable at least by different types of presentation applications;
receiving, by the apparatus, an input in a format specific to one of the presentation applications, and relating to presenting a first digital content item;
determining, by the apparatus, whether the ratings electronic data file includes a rating record having identification information identifying the first digital content item; and
selectively creating, by the apparatus, the rating record for the first digital content item.
2. The method as claimed in claim 1, further comprising:
calling, by the apparatus, in response to the input, an operating system; and
collecting information on the input on the basis of the call.
3. The method as claimed in claim 2, the collecting comprising:
recognizing the call on a platform level of the apparatus;
determining to transform, by the apparatus, information in the call into a presentation application independent format on the platform level; and
using, by the apparatus, transformed information to update the ratings electronic data file.
4. The method as claimed in claim 1, further comprising:
determining to display the ratings electronic data file;
receiving an update to the ratings electronic data file; and
updating, by the apparatus, the ratings electronic data file according to the received update.
5. The method as claimed in claim 1, further comprising:
filtering the ratings electronic data file according to user defined filtering rules; and
distributing the filtered ratings electronic data file.
6. An apparatus comprising:
at least one processor; and
at least one memory including computer program code for one or more programs,
the at least one memory and the computer program code configured to, with the at least one processor, cause the apparatus to perform at least the following,
determine to present digital content in a presentation application-specific format;
determine to store a ratings electronic data file including a rating record specifying at least identification information on a digital content item and a rating value indicating consumption of the digital content item, the ratings electronic data file being in a presentation application independent format and usable at least by different types of presentation applications;

determine whether the ratings electronic data file includes a rating record having identification information identifying a first digital content item; and selectively cause the apparatus to
create the rating record for the first digital content item.

7. The apparatus as claimed in claim 6, wherein the apparatus is further caused to:
detect a communication between one of the presentation applications and the operating system, the communication relating to presenting the first digital content item; and
determine to send information to a preference client based on the detected communication.

8. The apparatus as claimed in claim 7, wherein the communication contains information to be collected in the presentation application-specific format, and the apparatus is further caused to transform the information to the presentation application independent format and to determine to send the information to the preference client in the presentation application independent format.

9. The apparatus as claimed in claim 6, wherein the apparatus is further caused to:
determine to communicate when presenting the digital content,
detect communication information to be collected by a preference client;
convert the communication from the presentation application to the operating system into a first format used by the operating system, and the detected communication information into the presentation application independent format;
determine to send the communication converted into the first format to the operating system; and
determine to send the detected communication information converted into the presentation application independent format to the preference client.

10. The apparatus as claimed in claim 6,
wherein each presentation application of the presentation applications presents digital content in its presentation application-specific format, and
wherein the apparatus is further caused to:
collect information from a plurality of presentation applications in the apparatus, and
process the collected information into the ratings electronic data file.

11. The apparatus as claimed in claim 6, wherein the apparatus is further caused to:
receive explicit modifications to the ratings electronic data file; and
update the ratings electronic data file according to the received modifications.

12. The apparatus as claimed in claim 6, wherein the apparatus is a mobile terminal.

13. The apparatus as claimed in claim 6, wherein the presentation application independent format is a metadata format.

14. A non-transitory computer-readable storage medium carrying one or more sequences of one or more instructions which, when executed by one or more processors, cause an apparatus to at least perform the following steps:
determining, from a ratings electronic data file including a rating record specifying at least identification information on a digital content item and a rating value indicating consumption of the digital content item, the ratings electronic data file being in a presentation application independent format and usable at least by different types of presentation applications; and
selectively causing the apparatus to create a rating record for a first digital content item.

15. The computer-readable storage medium as claimed in claim 14, wherein the apparatus is caused to further perform:
collecting information on an input on the basis of one or more calls which the presentation application in the apparatus sends to an operating system of the apparatus, wherein the input is in a format specific to one of the presentation applications and relates to presenting the first digital content item.

16. The method of claim 1, further comprising:
determining that the ratings electronic data file includes the rating record for the first digital content item;
determining a new rating value using collected information associated with the input and the rating value in the rating record for the first digital content item; and
replacing the rating value in the rating record for the first digital content item with the new rating value.

17. The apparatus of claim 6, wherein the apparatus is further caused to:
determine that the ratings electronic data file includes the rating record for the first digital content item;
determine a new rating value using collected information associated with an input and the rating value in the rating record for the first digital content item, wherein the input is in a format specific to one of the presentation applications and relates to presenting the first digital content item; and
replace the rating value in the rating record for the first digital content item with the new rating value.

18. The computer-readable storage medium of claim 15, wherein the apparatus is caused to further perform:
determining that the ratings electronic data file includes the rating record for the first digital content item;
determining a new rating value using collected information associated with the input and the rating value in the rating record for the first digital content item; and
replacing the rating value in the rating record for the first digital content item with the new rating value.

* * * * *